Figure 1:
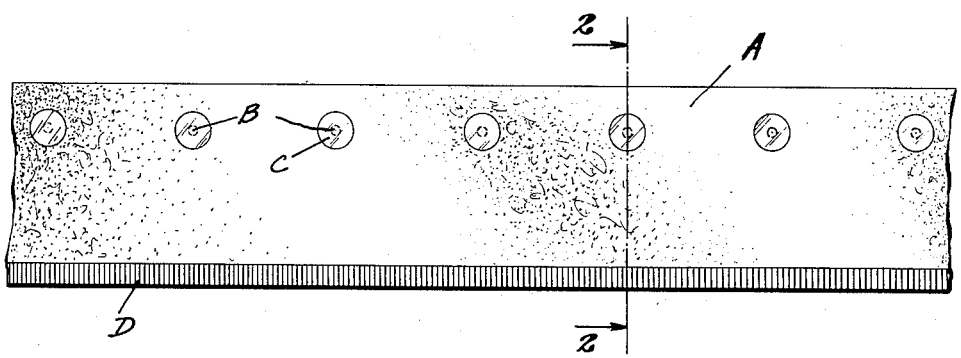

May 5, 1942.  A. C. FISCHER  2,281,927
SEED TAPE
Filed Jan. 6, 1937

Inventor
ALBERT C. FISCHER
By Knight Bros.
Attorney

Patented May 5, 1942

2,281,927

UNITED STATES PATENT OFFICE 2,281,927

SEED TAPE

Albert C. Fischer, Chicago, Ill.

Application January 6, 1937, Serial No. 119,210

2 Claims. (Cl. 47—56)

This invention relates to an improvement in seed tapes. Heretofore it has been the practice to glue seed to a tape flatwise and bury the tape flatwise a given depth.

My invention relates to a proper planting depth of the seed. I find that in seed planting, especially when inexperienced help is employed, it is difficult to have them plant the seed at the proper depth, with the result that much seed is lost in the process. Likewise most every variety of seed is to be planted at different depths, and it is almost impossible for a layman to grasp the importance of this. Therefore, by placing the seed on a tape at the proper depth from an edge and by covering the tape to the edge with soil the seed is covered at the proper depth.

It may be advantageous to have various perforations in the tape so that the soil can build in and around the tape, thereby anchoring same properly in the soil and creating a more natural condition which might otherwise be destroyed by the wall of the tape next to the seed. Perforations in the tape would give the root system a chance to develop without interference on any one side and by breaking this tape at certain sections after the seed has started to sprout and grow, it would be simpler to remove the same from the ground without breaking off the plant. By placing the strip edgewise in the ground there is no interference with the root growth, as might be the case where the seed is placed upon the center of a tape, as heretofore, and the tape buried flatwise in the soil.

Another object of my invention is to supply a seed tape depth planting device in which the perforations are spotted about the depth and the distance apart of the requirements for the respective seeds. A colloidal film is spread over the tape and over these perforations; such film preferably being of a soluble nature it is, therefore, readily decomposed and dissolved in the soil after being moistened. In the center of this perforation, now covered with this colloidal film, I deposit the seed. In this manner the tape is deposited edgewise and upon dissolution of the film there is nothing at all interposed between the seed and the soil and no interference of any kind as to its growth by reason of the tape being upon one side of the seed. In other words, upon dissolution of the film the seed is suspended in the soil as in the natural state. This is not the case where deposited on a tape flatwise and the root system is apt to sprout sideways instead of penetrating into the soil.

My tape can be prepared from a gelatinous, fibrous strip, a thin strip of paper, Cellophane or the like, of sufficient rigidity and strength to impress the seed tape edgewise into the ground. When heavier seeds are employed the strip would of necessity be of stiffer material.

The object of my invention is to place the seed on the strip by adhering the seed to the strip with a colloidal material, soluble in moisture, by touching the spot at uniform intervals of planting and placing the seed at the proper depth on the tape, so that when the tape is imbedded edgewise in the soil and the top of the strip is even with the soil, the seed will be planted at the proper depth and all that will be necessary will be to firm the ground around it.

Figure 2:
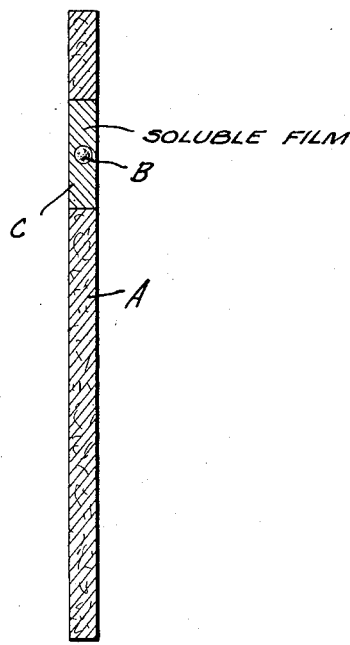

For a better illustration of my invention reference may be had to the accompanying drawing, in which Fig. 1 is a front elevation of a seed tape in accordance with the present invention, and Fig. 2 is a vertical sectional view along line 2—2 of Fig. 1.

In Fig. 1 is shown the tape A set edgewise, having seeds B supported thereon by means of a gelatinous or colloid film C which is disposed in apertures formed in the tape at a predetermined level thereof and in which film is embedded or supported the seed B. The row of seeds is at a predetermined level below the upper edge of the tape which may be considered a reference line therefor, the relative elevation of which with respect to the upper surface of the earth bed will determine the depth of the row of seeds within the bed.

As an additional refinement, the tape A in Fig. 1 is provided with a colored border D so that the bottom of the tape is easily distinguished from the top thereof. With such an arrangement, the instructions for planting this tape would be that the colored edge be placed downward in the ground. Likewise, any other reference line may be applied to the tape with instructions that such a line be placed coincident with, or at a predetermined displacement from, the surface of the earth bed whereupon the level of the seeds therein is fixed for the purpose of obtaining optimum conditions for the growth of the seeds. A fixed level for the row of seeds cannot be determined with assurance where the tape is placed flatwise and a groove or furrow is dug for the purpose of planting the same. With my improved invention no grooves or furrows are necessary because the tape itself is placed into the ground edgewise, thus eliminating the result of improper planting.

The seed tape may be of fibrous material or fibrous material impregnated with a fertilizer, or it may be impregnated with a reversible colloid or it may be furnished with insecticide sections as well.

What I claim is:

1. A seed tape adapted to be embedded in an earth bed with the seeds below the top surface of said bed a predetermined critical amount comprising a disintegrable thin planar carrier having a reference line and a plurality of apertures displaced from said line for a uniform extent, a soluble film covering each aperture and supporting a seed thereon, said carrier adapted to be disposed within said earth bed with its plane in a substantially vertical direction and its reference line bearing a predetermined relation to the top surface of the earth bed.

2. A seed tape adapted to be embedded in an earth bed with the seeds below the top surface of said bed a predetermined critical amount, comprising a disintegrable thin planar carrier having a plurality of apertures displaced from an edge of said carrier for a uniform extent, a disintegrable film covering each aperture and supporting a seed thereon, said carrier adapted to be disposed within said earth bed with its plane in a substantially vertical direction with said one edge thereof substantially coincident with the top surface of the earth bed.

ALBERT C. FISCHER.